United States Patent [19]
Rybak et al.

[11] 3,967,613
[45] July 6, 1976

[54] BARBECUE TYPE COOKING GRILL

[76] Inventors: Joseph F. Rybak, 5015 S. Lawler Ave., Chicago, Ill. 60638; Eugene C. Chamberlain, 1623 Lisbon Road, Morris, Ill. 60450; Paul E. Rybak, 138 Inner Court, New Lenox, Ill. 60451; Stanley W. Rybak, Rte. 3, Heatherfield, Morris, Ill. 60450

[22] Filed: Jan. 16, 1975

[21] Appl. No.: 541,453

[52] U.S. Cl. .............................. 126/41 R; 99/447; 126/25 R
[51] Int. Cl.² ........................................ A47J 37/07
[58] Field of Search ................ 126/41, 20, 25 R; 99/446, 447, 445; 431/346

[56] References Cited
UNITED STATES PATENTS

| | | | |
|---|---|---|---|
| 2,722,883 | 11/1955 | Rignell | 99/447 |
| 2,746,378 | 5/1956 | Lang | 126/41 X |
| 3,299,800 | 1/1967 | Angelo | 126/20 X |
| 3,638,635 | 2/1972 | Drennan | 126/41 R |

FOREIGN PATENTS OR APPLICATIONS 118,198  12/1926  Switzerland .................. 126/41 R

*Primary Examiner*—Edward G. Favors
*Attorney, Agent, or Firm*—Arnstein, Gluck, Weitzenfeld & Minow

[57] ABSTRACT

A cooking grill which provides moist or dry heat for cooking meat or meat products and which includes an enclosure, a heat source, a body of water in the enclosure and a foraminous member above the heat source to prevent the passage of flame so as to preclude flare-up due to ignition of fat drippings.

2 Claims, 8 Drawing Figures

BARBECUE TYPE COOKING GRILL

BACKGROUND OF THE INVENTION

This invention relates to an improved barbecue type cooking grill which provides intense heat and a humidified atmosphere for rapid cooking of meat and meat products, without flare-ups and burning or charring, and which produces a cooked meat product which is tender and juicy. More particularly, this invention embodies a heat source, a water reservoir and a foraminous member in a particular arrangement for producing the desired results.

SUMMARY OF THE INVENTION

One of the objects of this invention is the provision of a cooking grill which provides intense moist or dry heat, which effects more rapid cooking of meat and meat products than prior apparatus. Burning or drying of the product being cooked is avoided, with the result that the cooked product is juicier and more palatable than corresponding products cooked by prior art apparatus.

Another object of this invention is the provision of a cooking apparatus which provides a cooking medium which effects deep moist heat penetration into meat or meat products resulting in more rapid cooking.

A further object of this invention is the provision of a cooking apparatus utilizing a foraminous member above the heat source, said member effecting uniform distribution of heat and preventing flare-ups due to ignition of fat drippings.

Other and further objects and advantages of this invention will become apparent from the following description when considered in connection with the accompanying drawings.

BRIEF DESCRIPTION OF A PREFERRED EMBODIMENT

Figure 1:
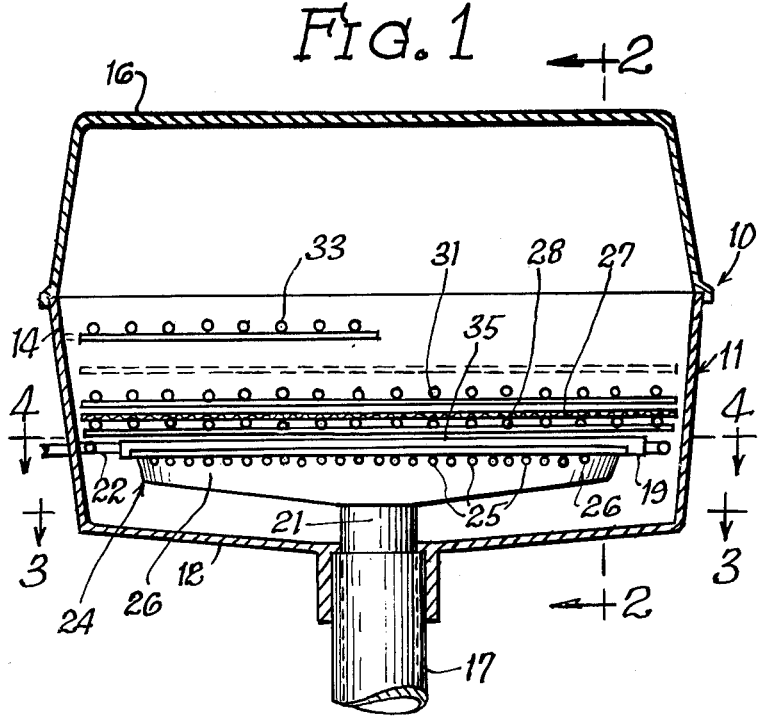
FIG. 1 is a vertical cross-sectional view of a cooking grill, partly in elevation, in accordance with the present invention.

Referring to the drawings, there is shown a gas fired outdoor cooking apparatus, indicated generally by the numeral 10, and suitable for use either with natural gas or propane. The apparatus comprises a box-like cooking enclosure 11 having a bottom wall 12 and vertical side and end walls 13 and 14, respectively. Preferably, the enclosure 11 is provided with a hinged cover 16 and is supported on a suitable base or pedestal 17. The bottom wall 12 is provided with a plurality of generally rectangular openings 18, which may be arranged in any suitable pattern. The openings 18 admit secondary combustion air during operation.

A gas inlet opening 21 is provided centrally of the bottom wall 12. A conventional gas burner 24, H-shaped in plan view, is mounted over the gas inlet opening 21 with the arms 26 overlying the openings 18 and in vertically spaced relation thereto. A gas burner of this type is disclosed in U.S. Pat. No. 3,638,635. The burner 24 is provided with flame apertures 25 in the vertical side walls thereof which direct the flame jets laterally.

Figure 2:
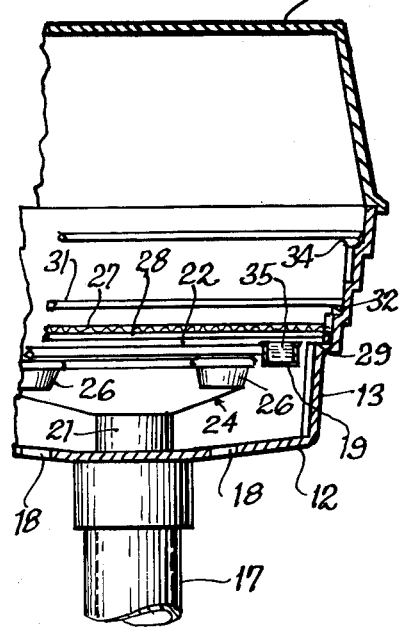
FIG. 2 is a cross-sectional view taken substantially on line 2—2 of FIG. 1.
Figure 3:
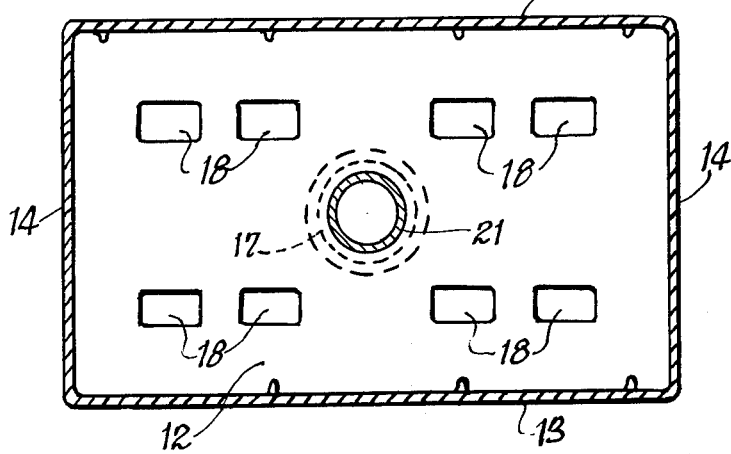
FIG. 3 is a cross-sectional view taken substantially on line 3—3 of FIG. 1.
Figure 5:
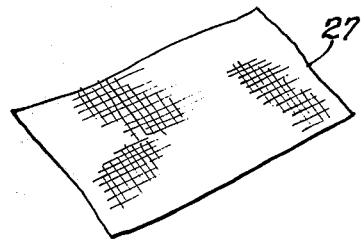
FIG. 5 is a perspective view of a foraminous member constituting a part of the invention.
Figure 4:
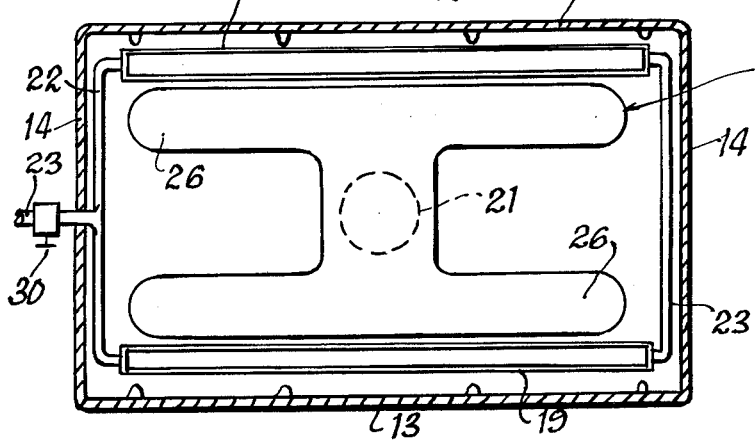
FIG. 4 is a cross-sectional view taken substantially on line 4—4 of FIG. 1.
Figure 6:
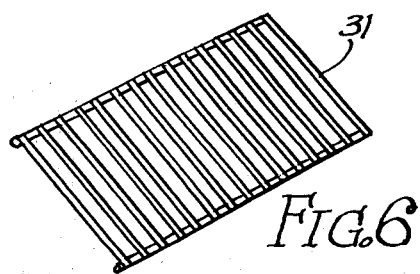
FIG. 6 is a perspective view of a grid.
Figure 7:
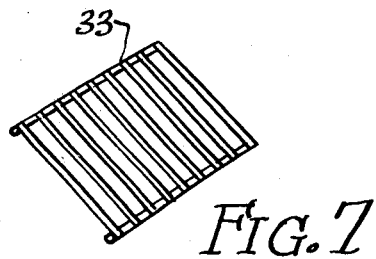
FIG. 7 is a similar view of a modified grid.

A pair of elongated shallow pans 19 are suitably supported in the enclosure 11, each between a wall 13 and a corresponding arm 26 of the burner 24. As seen clearly in FIG. 2, each pan 19 is disposed in close proximity to a respective arm 26 and substantially at the same elevation, so that the flame jets emanating from the burner apertures 25 impinge on a surface of the pan to heat the same and the contents therein, as will be explained hereafter. The pans 19 are connected, each at both ends, to a header conduit 22 which in turn is connected to a water supply line 23 provided with a control valve 30.

A thin foraminous member 27 is disposed from ½ inch to 3 inches above the burner 24 and is suitably supported in such position, preferably on a rack or grid 28 resting on shoulders 29 provided on the inner surfaces of the side walls 13 of the enclosure. The member 27 may be formed of perforated, woven or expanded metal having an open area of 20–40%. Excellent results have been achieved with an open area of approximately 28%. In the case of a woven metal fabric a 14 by 14 mesh size would approximate a 28% open area. The metal forming the member 27 may be stainless steel or any other suitable heating resisting metal.

Disposed above the member 27 is a cooking grid 31 which is suitably supported as on shoulders 32 formed on the inner surfaces of walls 13. A second cooking grid 33 of reduced length and supported at a higher elevation on shoulders 34 above the grid 33 may be provided.

In operation, a body of water 35 is admitted into each pan 19. When the gas is ignited, the flame jets along the inner edges of the burner arms 26 impinge on the pans 19 heating the same and converting the water therein into steam which, together with the dry heat generated by the other flame jets, passes upwardly through the foraminous member 27 and provides an atmosphere of moist heat enveloping the meat product rested on the grids 31 or 33. The moist heat effects very rapid cooking of the meat or meat product which minimizes drying and shrinkage results in a cooked product which is both juicy and tender. The foraminous member 27 precludes the passage of any flame therethrough, thereby eliminating ignition of fat drippings on the member 27 with consequent flare-up which normally would tend to char the meat product being cooked. The drippings on the member 27 however, tend to smolder and impart to the meat product a desired charcoal flavor.

The valve 30 is adjusted to admit a flow of water to the pans 19 sufficient to maintain a desired level of water in each pan.

Figure 8:
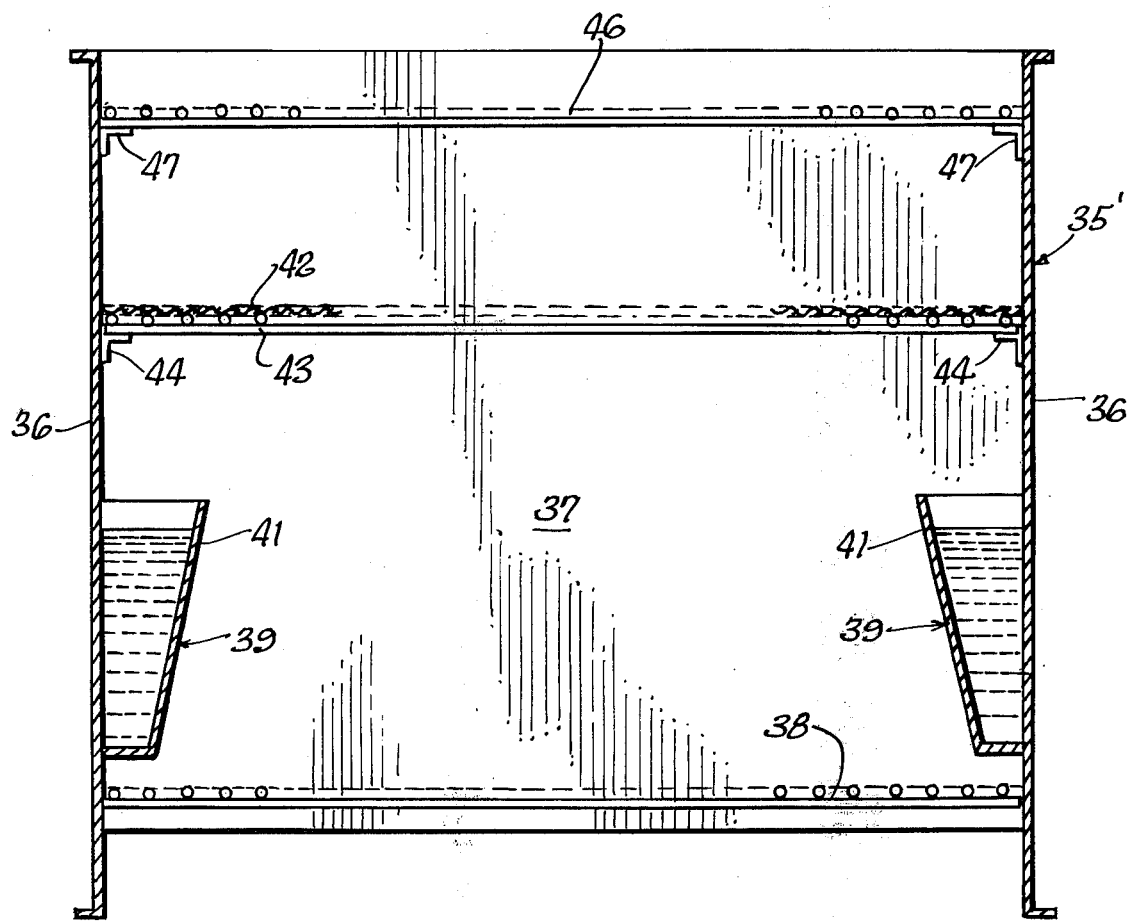
FIG. 8 is a vertical cross-sectional view, generally diagrammatic, of a modified embodiment.

In the modified embodiment illustrated in FIG. 8, the grill comprises a box-like enclosure 35' having generally vertical side and end walls 36 and 37 respectively, and a bottom wall constituting a grate 38. Suitably mounted on each of the side walls 36 and extending longitudinally thereof is an elongated pan 39 shaped in cross section, substantially as illustrated. The inner wall 41 of each pan, preferably, is inclined upwardly away from the wall 36 and provides a heat exchange surface. In a conventional sized grill the tops of the pans 39 are located approximately at a height of 4 inches above the grate 38.

A thin foraminous member 42, similar to member 27, is disposed approximately 1½ - 2½ inches above the tops of pans 39 and is suitably supported on a rack or grid 43 resting on shoulders 44 provided on the inner surfaces of walls 36. A cooking grid 46 is suitably supported on shoulders 47 carried on the side walls 36, approximately 2–3 inches above the member 42.

In operation, the pans 39 are filled with water and a bed of charcoal or wood is placed on the grate 38 between the pans 39 and ignited in a well known manner. Preferably, the bed of the ignitable material should not exceed a maximum height of 4 inches above the grid 38. The heat generated by the burning material heats the water in the pans 39 and the steam together with the dry heat passes upwardly through the foraminous member 42 providing an atmosphere of moist heat for cooking, as in the case of the first described embodiment. The foraminous member 42 functions exactly as the member 27 in the first described embodiment.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A cooking grill comprising, an enclosure, a heat source, a pair of elongated pans each extending longitudinally of said enclosure and containing a body of water and adapted to be heated by said heat source to generate moist heat, a foraminous member disposed above said heat source, and a cooking grid disposed above said foraminous member for supporting a food product to be cooked, the foraminous member being of such character so as to preclude the passage of flame therethrough while permitting the passage of moist heat to effect cooking of the food product.

2. A cooking grill comprising, an enclosure, a heat source, a receptacle containing a body of water and adapted to be heated by said heat source to generate moist heat, a foraminous member disposed above said heat source, a cooking grid disposed above said foraminous member for supporting a food product to be cooked, the foraminous member being of such character so as to preclude the passage of flame therethrough while permitting the passage of moist heat to effect cooking of the food product, conduit means connecting said receptacle to a water supply source and valve means for regulating the flow of water to said receptacle.

* * * * *